United States Patent [19]
Choi et al.

[11] Patent Number: 5,936,760
[45] Date of Patent: Aug. 10, 1999

[54] DEFORMABLE MIRROR DEVICE AND MANUFACTURING METHOD THEREOF

[75] Inventors: Bum-kyoo Choi, Seongnam; Yong-kweon Kim; Jong-woo Shin, both of Seoul, all of Rep. of Korea

[73] Assignee: Samsung Electronics Co., Ltd., Kyungki-do, Rep. of Korea

[21] Appl. No.: 08/872,160

[22] Filed: Jun. 10, 1997

[30] Foreign Application Priority Data

Jun. 10, 1996 [KR] Rep. of Korea ................ 96-20611

[51] Int. Cl.⁶ .................................................. G11C 13/04
[52] U.S. Cl. .......................... 359/298; 359/223; 359/290; 359/291; 359/295
[58] Field of Search .................................. 359/290, 291, 359/295, 850, 851, 223, 224, 298

[56] References Cited

U.S. PATENT DOCUMENTS 4,710,732  12/1987  Hornbeck ........................... 359/290
5,083,857  1/1992  Hornbeck ........................... 359/291

FOREIGN PATENT DOCUMENTS

A0069226   1/1983   European Pat. Off. .
WO 9503562 2/1995   WIPO .
WO/95-03562 2/1995  WIPO .

*Primary Examiner*—Georgia Epps
*Assistant Examiner*—Margaret Burke
*Attorney, Agent, or Firm*—Sughrue, Mion, Zinn, Macpeak, PLLC

[57] ABSTRACT

A deformable mirror device and manufacturing method therefor. The method includes the steps of forming an electrode layer on a substrate in a predetermined pattern, forming a thick film on the upper surfaces of the substrate and the electrode layer, forming a support plate on the upper surface of the thick film, and partially etching the thick film to form at least one through hole. The method further includes separating the support plate into single portions, forming a post on one side of the inner surface of the through hole, forming a reflecting plate on the upper surface of the support plate, and removing the thick film.

8 Claims, 9 Drawing Sheets

DEFORMABLE MIRROR DEVICE AND MANUFACTURING METHOD THEREOF

BACKGROUND OF THE INVENTION

The present invention relates to a deformable mirror device and a manufacturing method thereof and, more particularly, to a deformable mirror device having a large effective reflection area and a simple configuration and a manufacturing method therefor.

Figure 1:
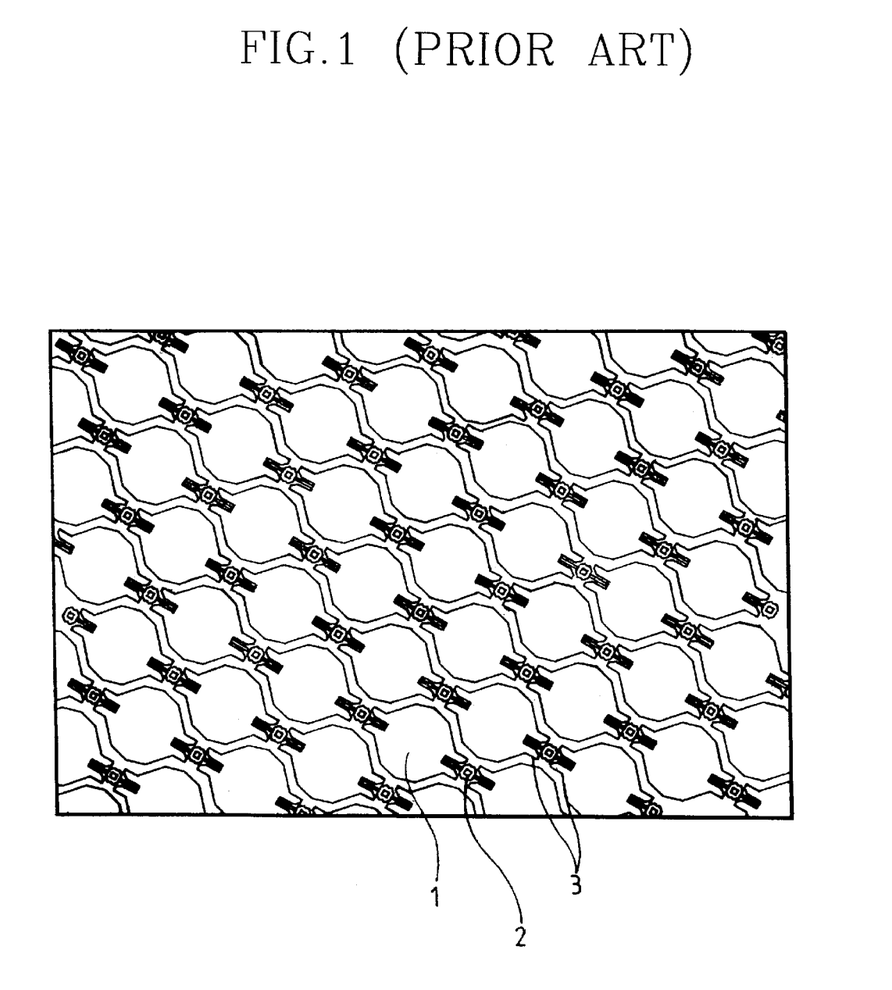
FIG. 1 is a plan view of a conventional deformable mirror device.

As shown in FIG. 1, a typical deformable mirror device has a plurality of reflecting mirrors 1 each rotatably connected to a post 2 via a hinge 3. Each of the reflecting mirrors 1 is rotated by static electricity, and reflects light incident thereto at a predetermined angle. The deformable mirror device is used in a video displaying device for a projection television and in a light scanning device for a scanner, a copying machine, a facsimile machine, etc. The reflecting mirrors 1 of the deformable mirror device are arranged in a two-dimensional way having one mirror per pixel of an image. Each reflecting mirror 1 is rotated according to the respective pixel of an image signal to reflect light, whereby the color and brightness are controlled.

A manufacturing method of a "Multi-level Deformable Mirror Device" disclosed in U.S. Pat. No. 5,083,857 assigned to Texas Instruments Inc. will be described with reference to FIG. 2.

Figure 2:
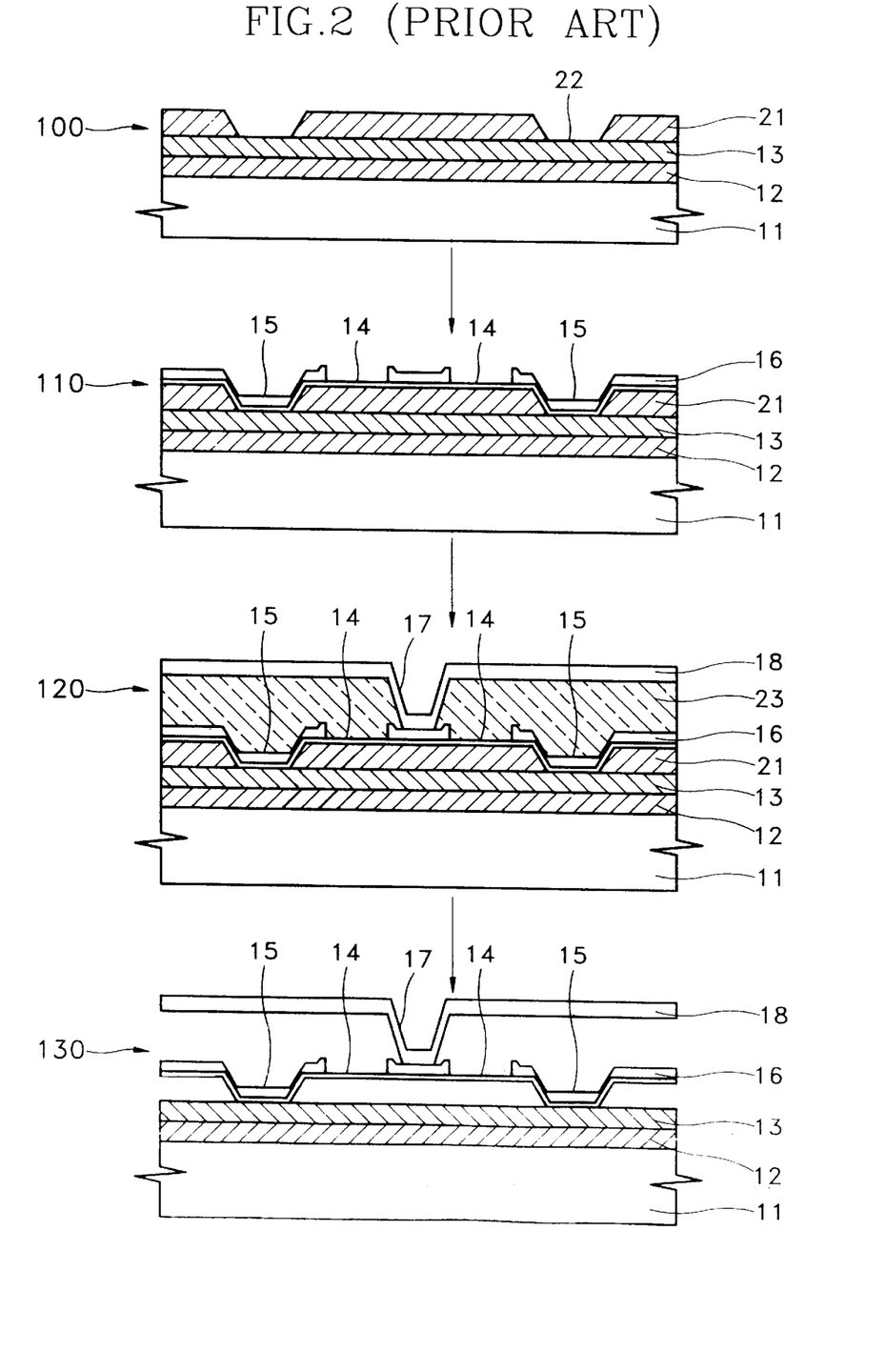
FIG. 2 shows a manufacturing process of the conventional deformable mirror device.

As shown in FIG. 2, a static random access memory (SRAM) 12 and an oxide protective film 13 are sequentially formed on the upper surface of a substrate 11 including an address scanning circuit. Then, a first spacer layer 21 having a predetermined pattern 22 is formed on the oxide protective film 13, in step 100.

In step 110, a hinge 14 is formed on the upper surface of the first spacer layer 21 by a sputtering method, and an electrode 16 having a first support post 15 is formed on the upper surface of the hinge 14.

In step 120, a second spacer layer 23 is formed on the electrode 16, and a reflecting mirror 18 having a second support post 17 is then formed thereon. In this case, the reflecting mirror 18 is typically formed by sputtering aluminum.

Finally, the first and second spacer layers 21 and 23 are removed, thereby completing a deformable mirror device, in step 130.

However, when defects are generated during manufacturing of the hinge 14, the reflecting mirror 18, etc., formed on the upper surface of the SRAM 12 during manufacture of the deformable mirror device, the SRAM 12 is damaged. Also, a plurality of layers must be sequentially formed on the upper surface of the substrate 11, so the manufacturing process of the deformable mirror device is complicated.

SUMMARY OF THE INVENTION

To solve the above problems, it is an object of the present invention to provide a deformable mirror device having a large effective area for light reflection and a simple structure, and a simplified manufacturing method thereof.

To accomplish the above object, there is provided a deformable mirror device comprising: a substrate defining an upper surface; a plurality of electrodes formed on the upper surface of the substrate; a reflecting mirror installed over the electrodes and operative to incline with respect to the electrodes, said reflecting mirror defining a lower surface; and at least one post having one end which is connected to the substrate between the electrodes and another end which is integrally combined with the lower surface of the reflecting mirror to support the reflecting mirror, and having elasticity so that the reflecting mirror is operative to be inclined.

According to the present invention, a method of manufacturing a deformable mirror device comprises the steps of: forming an electrode layer on a substrate in a predetermined pattern; forming a thick film on upper surfaces of the substrate and the electrode layer; forming a support plate having a predetermined pattern on an upper surface of the thick film; situating a mask having a predetermined pattern on an upper surface of the support plate and partially etching the support plate and the thick film to form at least one through hole; coating a photoresist on the upper surface of the support plate and within the through hole and exposing and etching the coated photoresist using a mask having a predetermined pattern so that edge portions of the support plate are removed, thereby to separate the support plate from adjacent support plates; forming a post on one side of an inner surface of the through hole by a sputtering; forming a reflecting plate on the upper surface of the support plate; and removing the thick film.

Also, according to another aspect of the present invention, a method of manufacturing a deformable mirror device comprises the steps of: forming an electrode layer on a substrate in a predetermined pattern; forming a thick film on upper surfaces of the substrate and the electrode layer; situating a mask having a predetermined pattern on an upper surface of the thick film and partially etching the thick film to form at least one through hole; coating a photoresist within the through hole and exposing and etching the coated photoresist using a mask having a predetermined pattern so that edge portions of the support plate are removed, thereby to separate the support plate from adjacent support plates; forming a post on one side of an inner surface of the through hole by a sputtering; forming a support plate on the upper surface of the thick film; forming a photoresist layer within the through hole; forming a reflecting plate on the support plate and the photoresist layer to fill up an upper part of the through hole; and removing the thick film and the photoresist layer.

BRIEF DESCRIPTION OF THE DRAWINGS

The above objects and advantages of the present invention will become more apparent by describing in detail preferred embodiments thereof with reference to the accompanying drawings, in which.

DETAILED DESCRIPTION OF THE PREFERRED EMBODIMENTS

Figure 3:
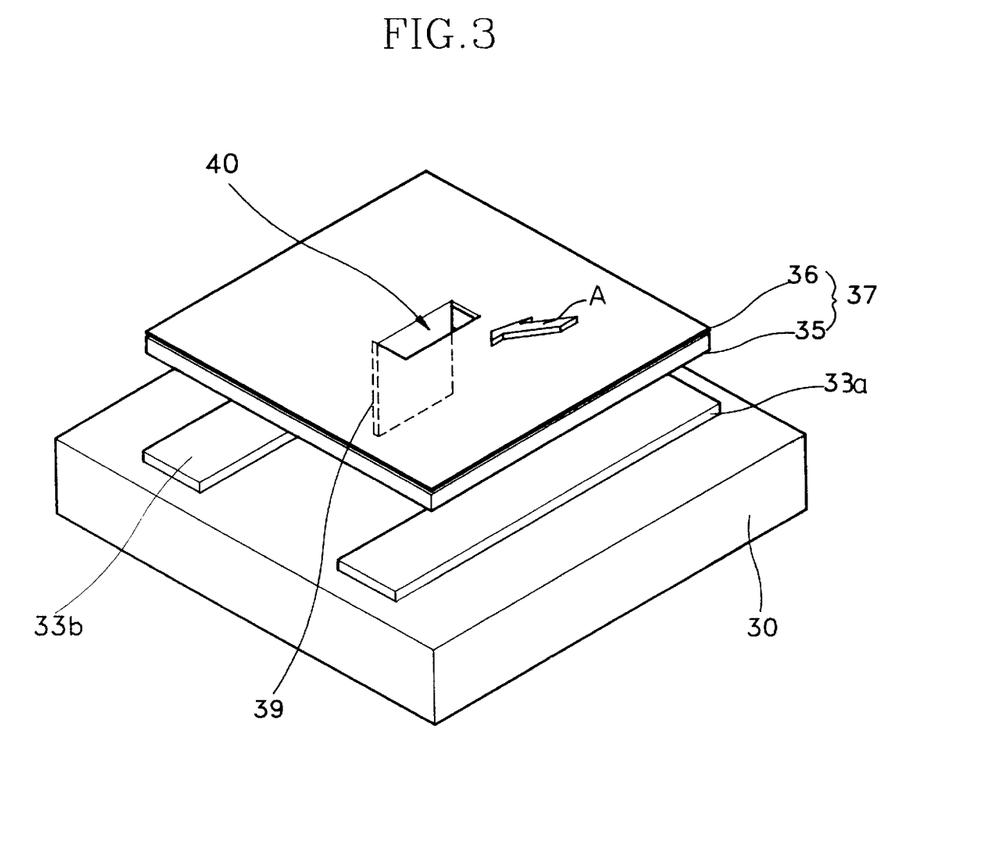
FIG. 3 is a perspective view of a deformable mirror device according to an embodiment of the present invention.
Figure 4A:
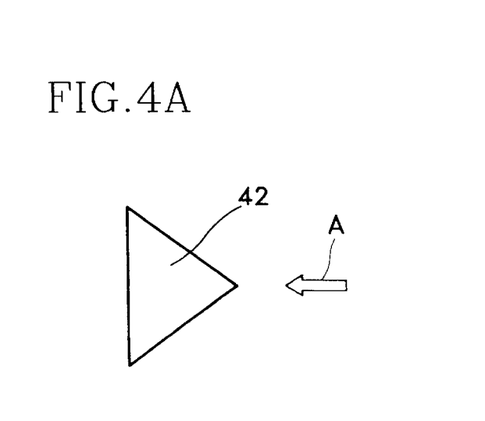
FIGS. 4A through 4D are plan views showing various shapes of a through hole of FIG. 3.
Figure 4B:
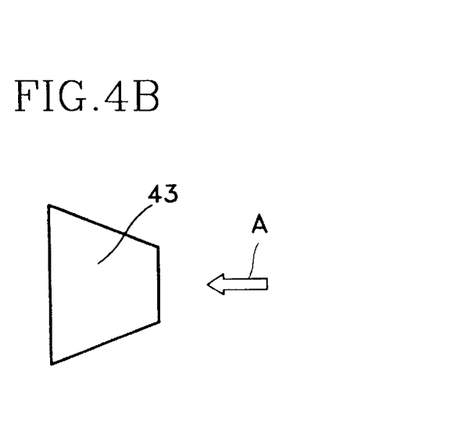
Figure 4C:
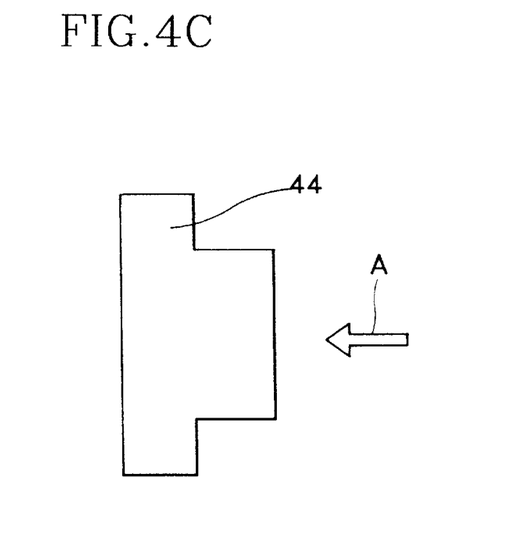
Figure 4D:
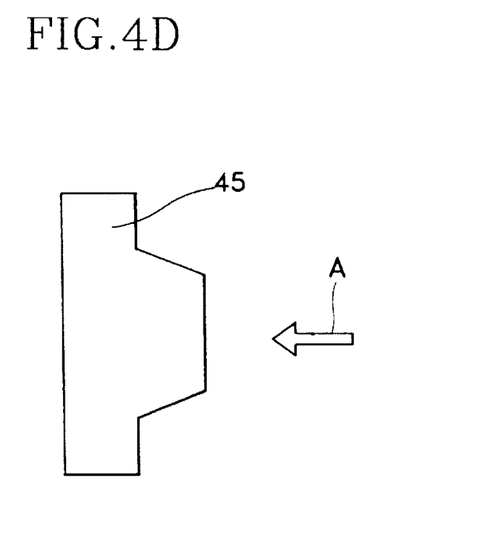

Referring to FIG. 3, a deformable mirror device according to an embodiment of the present invention includes a substrate 30 having an address scanning circuit (not shown) and at least a pair of electrodes 33a and 33b formed in a strip pattern on the upper surface of the substrate 30. A post 39 is formed between the electrodes 33a and 33b on the substrate 30. The post 39 is combined with the substrate 30 and vertical thereto, and can be bent elastically.

A reflecting mirror 37 is combined with the upper end of the post 39. The reflecting mirror 37 is a two-layered structure comprised of a support plate 35 and a reflecting plate 36 formed on the support plate 35. The support plate 35 faces the electrodes 33a and 33b, and the angle of the reflecting mirror 37 is varied by static electricity between the support plate 37 and the electrodes 33a and 33b. Also, the reflecting plate 36 reflects incident light.

A through hole 40 for forming the post 39 therethrough is formed in the reflecting mirror 37. The reflecting plate 36 and the post 39 are formed as one body by the sputtering or the evaporation method through the through hole 40. At this time, it is preferable that the post 39 is formed thinly, by the sputtering or evaporation method in the direction indicated by an arrow A, to facilitate the inclination of the reflecting mirror 37. Also, it is preferable that the area of the through hole 40 is reduced to enlarge the effective reflection area of the reflecting mirror 37 as much as possible.

The through hole 40 can have a shape of not only a rectangle as shown in FIG. 3 but also a triangle 42, a trapezoid 43, a letter "T" 44 and a combination 45 of the rectangle and the trapezoid, as shown in FIGS. 4A through 4D. In this case, an arrow A in each drawing denotes the deposition direction.

Figure 5:
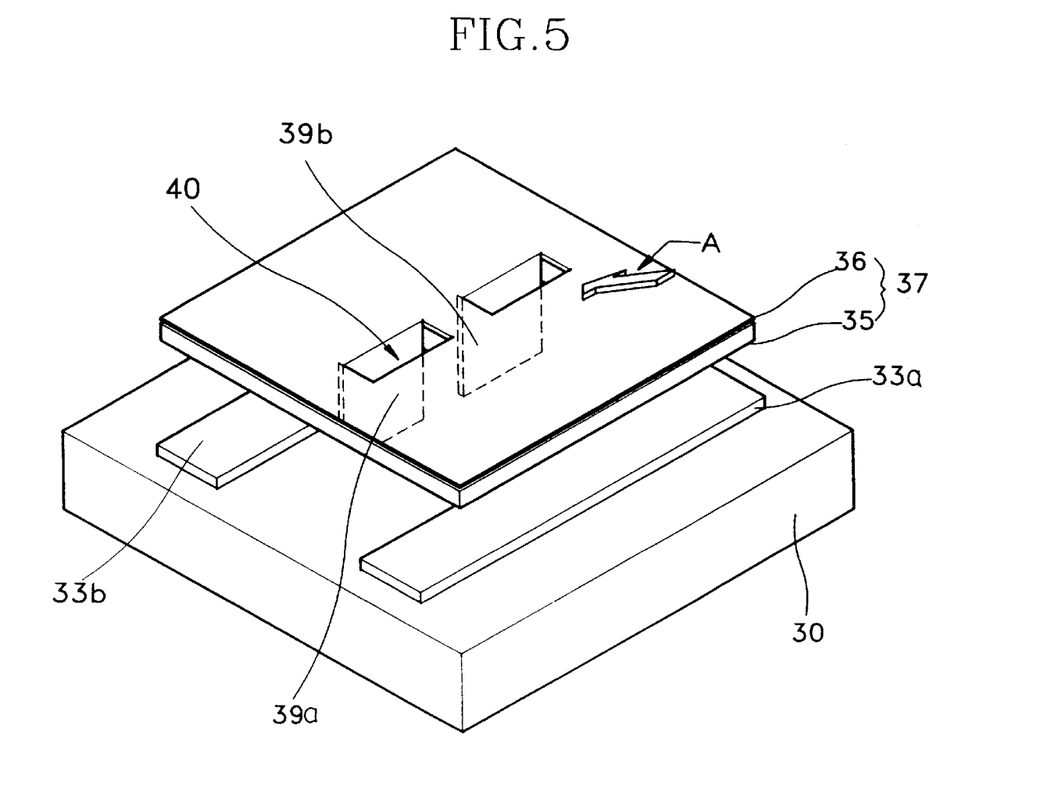
FIG. 5 is a perspective view of a deformable mirror device to explain another embodiment of a post of FIG. 3.

As shown in FIG. 5, the deformable mirror device according to the present invention can include at least two posts 39a and 39b formed in a line between the electrodes 33a and 33b on the substrate 30. When the number of the posts is not less than two, the reflecting mirror 37 can be prevented from being twisted by temperature and the residual stress.

Figure 6:
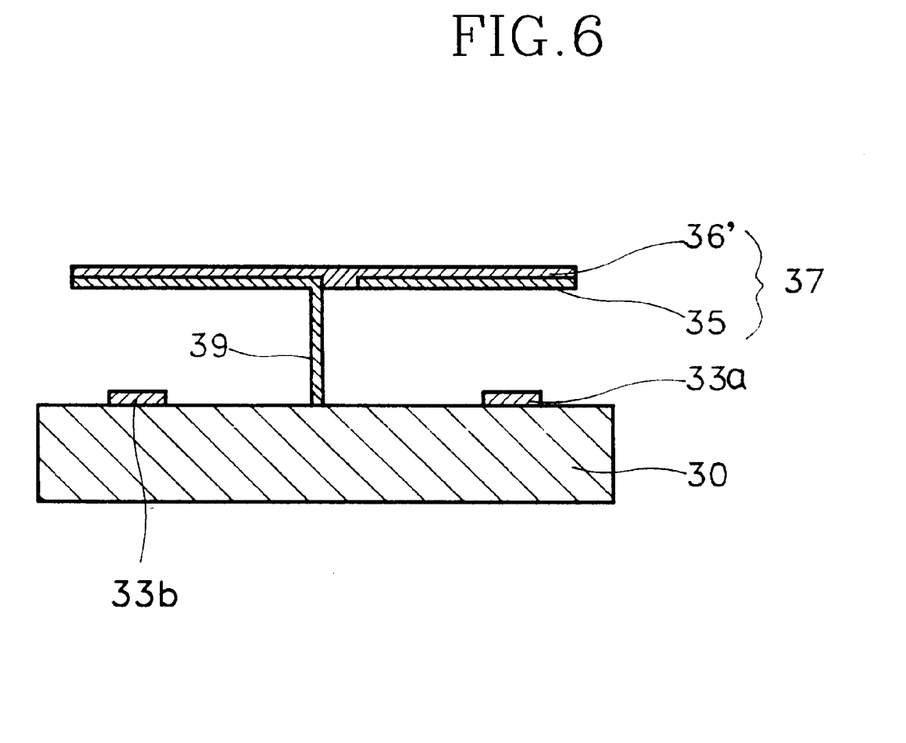
FIG. 6 is a sectional view of a deformable mirror device according to another embodiment of the present invention.

FIG. 6 shows a deformable mirror device according to another embodiment of the present invention. In this embodiment, reference numerals common to the previous drawings denote the same members as in the previous drawings. According to the present embodiment, a through hole is not present in a reflecting plate 36'. That is, the effective reflection area of the reflecting mirror 37 is enlarged by filling up the through hole 40 (see FIG. 3) formed through the reflecting plate 36'.

In the operation of the deformable mirror device according to the present invention having such a structure, when electrical potential depending on the address scanning circuit of the substrate 30 of FIG. 3 is applied through the electrodes 33a and 33b, static electricity is generated between the reflecting mirror 37 and the electrodes 33a and 33b due to a difference in electric potential, whereby a torque inclining the reflecting mirror 37 is generated. Accordingly, while the post 39 is bent, the reflecting mirror 37 is inclined at a predetermined angle. When there is no potential difference between the electrodes 33a and 33b and the reflecting mirror 37, the post 39 is restored to the original state and the reflecting mirror 37 goes back to a horizontal state.

Figure 7A:
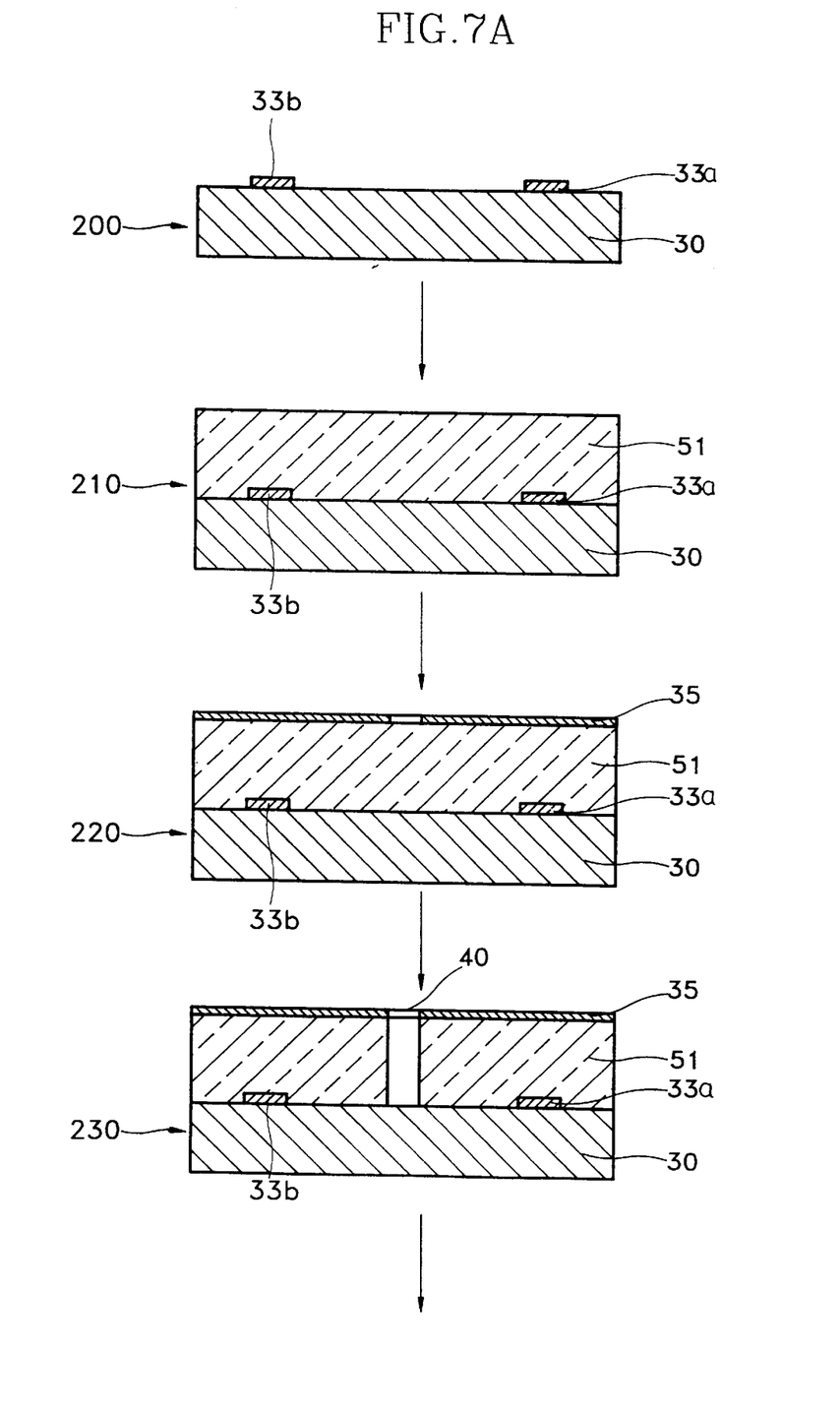
FIGS. 7A and 7B are sectional views showing a manufacturing method of a deformable mirror device according to an embodiment of the present invention.
Figure 7B:
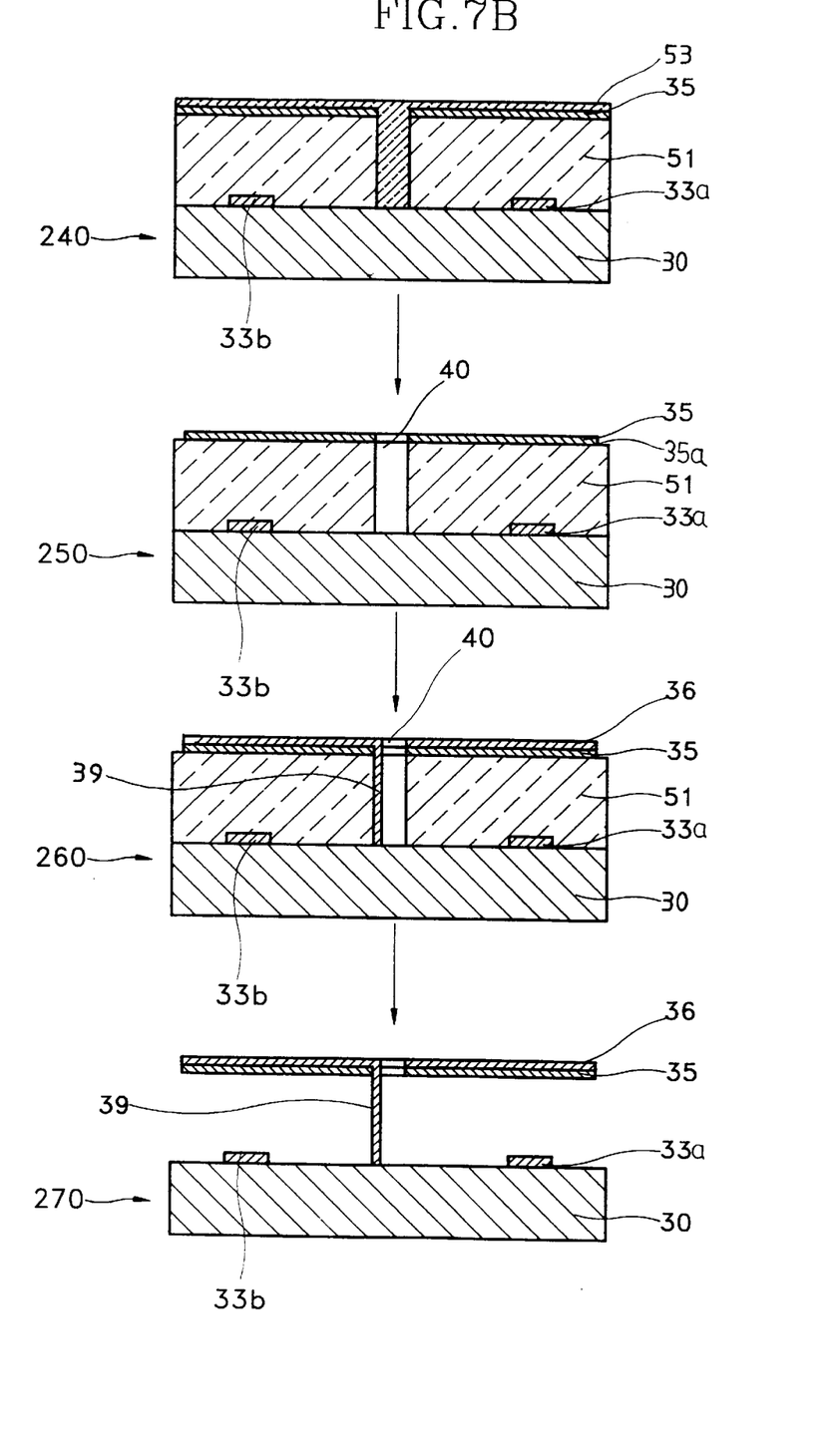

Hereinafter, a manufacturing process of the deformable mirror device according to the present invention will be described with reference to FIGS. 7A and 7B. First, in step 200, electrodes 33a and 33b are formed in a predetermined shape on a substrate 30 made of silicon or glass. To be more specific, a metal to be used as a material of the electrodes 33a and 33b is coated onto the substrate 30 by a sputtering method or an evaporation method, and a photoresist (not shown) is then coated onto the resultant structure. Next, a mask corresponding to the pattern of the electrodes 33a and 33b is situated on the photoresist, exposed and then etched. This portion of the process is carried out using a typical widely-known method.

In step 210, a thick film 51, which is composed of photoresist, polymethyl methacrylate (PMMA) or polyimide, is formed in a thickness corresponding to the height of the post 39 (see FIG. 3) on the substrate 30 on which the electrodes 33a and 33b are formed.

In step 220, a support plate 35 made of a metal such as aluminum (Al) having a predetermined pattern is formed on the upper surface of the thick film 51. The support plate 35 is formed by a lithography process.

In step 230, with a mask positioned over the support plate 35, the support plate 35 and the thick film 51 are partially etched by a reactive ion etching (RIE) method, thereby forming a through hole 40. As mentioned above, the through hole can be formed in various shapes, and more than one through hole can be formed.

In step 240, a photosensitive film such as a photoresist 53 is coated on the through hole 40 and the support plate 35 in order to separate the support plate 35 from adjacent support plates (not shown).

In step 250, a mask having a predetermined pattern is situated on the photoresist 53, exposed and then etched so that an edge portion 35a of the support plate 35 is removed, thereby separating the support plate 35 from adjacent support plates.

In step 260, the substrate 30, the thick film 51 and the support plate 35 are inclined at a predetermined angle and sputtering or evaporating is performed, thereby forming a post 39 on the inner surface of one side of the through hole 40. Simultaneously, a reflecting plate 36 is formed on the upper surface of the support plate 35. The post 39 and the reflecting plate 36 are formed of a metal having excellent electrical conductivity and reflectivity, e.g., aluminum (Al).

Lastly, the thick film 51 is removed by etching, in step 270.

Figure 8A:
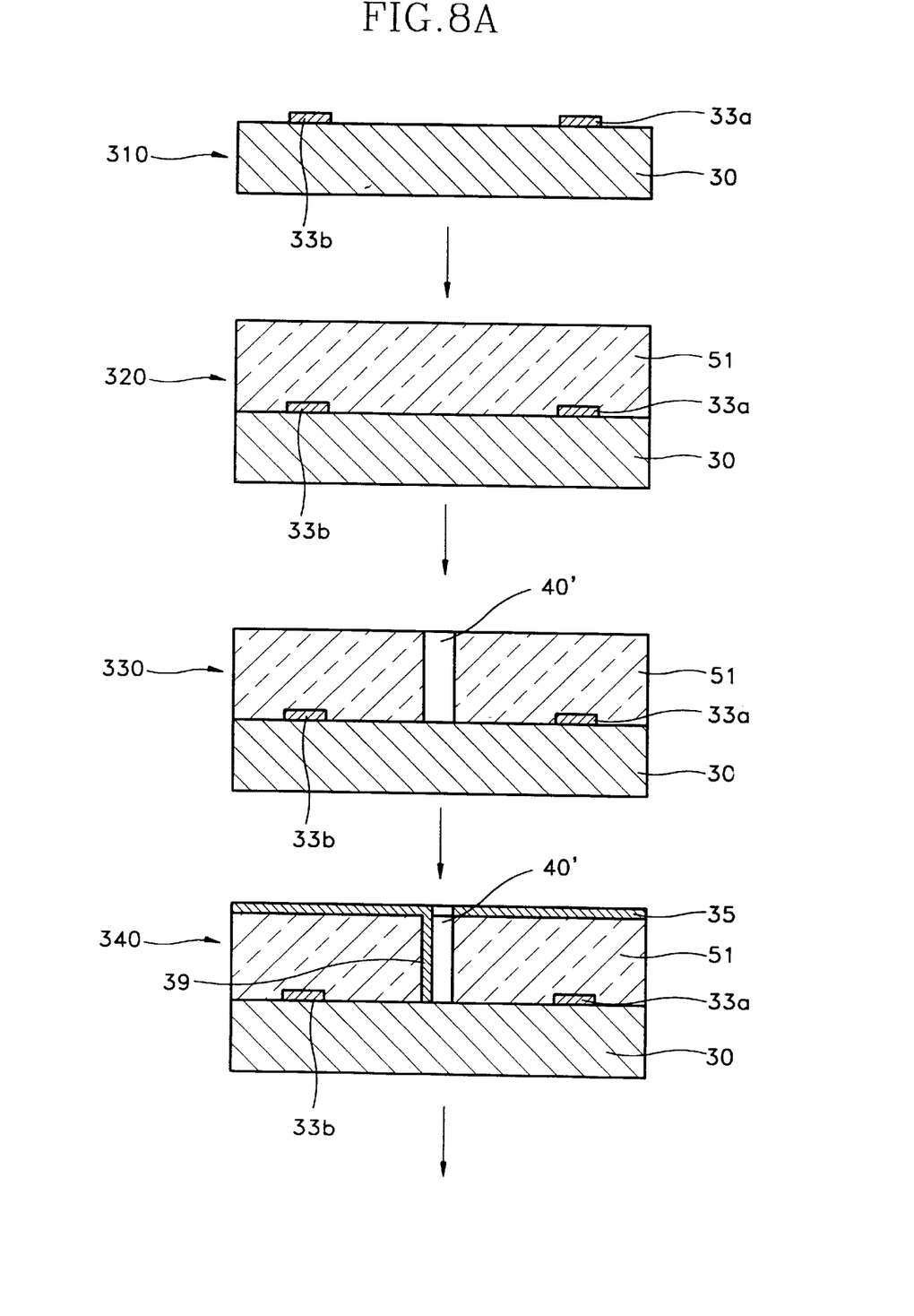
FIGS. 8A and 8B are sectional views showing a manufacturing method of a deformable mirror device according to another embodiment of the present invention.
Figure 8B:
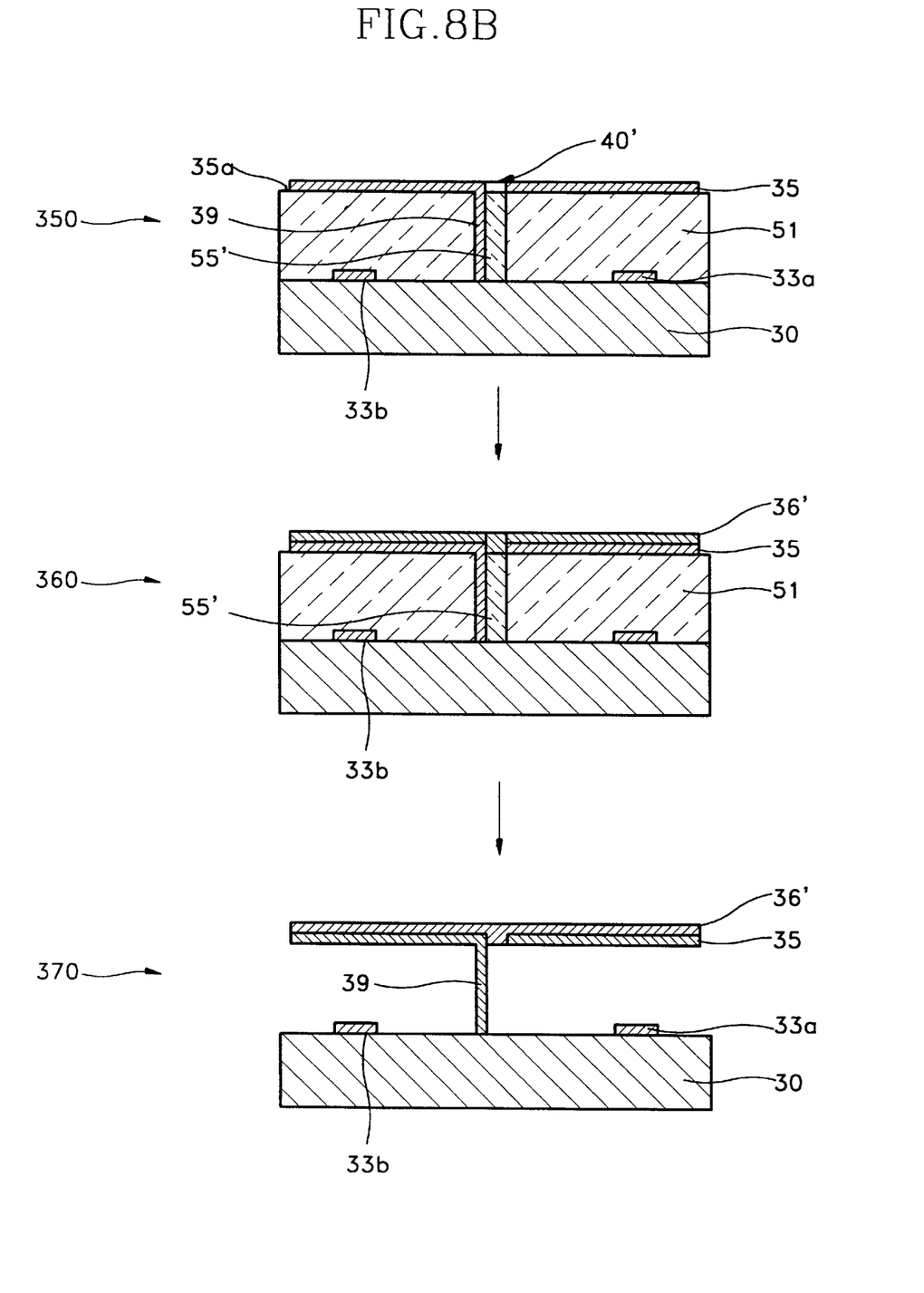

Now, a manufacturing method of the deformable mirror device according to another embodiment described in connection with the device of FIG. 6 will be explained referring to FIGS. 8A and 8B.

First, the electrodes 33a and 35b are formed in a predetermined shape on the substrate 30 made of silicon or glass, in step 310. The thick film 51 is formed on the substrate 30 having the electrodes 33a and 33b formed thereon, in step 320.

Then, a mask is situated on the thick film 51 and partially etched by the reactive ion etching (RIE) method, thereby forming a through hole 40', in step 330. As described above, the through hole can be formed in various shapes, and more than one through hole can be formed.

In step 340, the substrate 30 and the thick film 51 is inclined at a predetermined angle and sputtering or evaporating is performed, thereby forming the post 39 on the inner surface of one side of the through hole 40'. Simultaneously, the support plate 35 is formed on the upper surface of the thick film 51. The post 39 and the support plate 35 are formed of a metal having a superior electrical conductivity, e.g., aluminum (Al). Thereafter, the edge portion 35a of the support plate 35 is removed so that the support plate 35 is separated from adjacent support plates, which step is not shown.

Next, a photoresist layer 55' is formed within the through hole 40' through which the post 39 is formed, in step 350. A reflecting plate 36' is formed on the resultant structure, in step 360. At this time, the reflecting plate 36' is formed to be able to fill up the through hole 40'. Then, the thick film 51 and the photoresist layer 55' are removed, thereby completing the deformable mirror device, in step 370.

The deformable mirror device according to the present invention has a simple structure, and the through hole formed in the reflecting plate is filled, so that the effective reflecting area of the reflecting plate can be further enlarged.

The manufacturing process of the deformable mirror device according to the present invention has a small number of manufacturing steps and is simple, so that production efficiency can be increased.

It is contemplated that numerous modifications may be made to the deformable mirror device and manufacturing method of the present invention without departing from the spirit and scope of the invention as defined in the following claims.

What is claimed is:

1. A method of manufacturing a deformable mirror device, comprising, stated in the following order, the steps of:

forming an electrode layer on a substrate in a predetermined pattern;

forming a thick film on upper surfaces of said substrate and said electrode layer;

forming a support plate having a predetermined pattern on an upper surface of said thick film;

situating a mask having a predetermined pattern on an upper surface of said support plate and partially etching said support plate and said thick film to form at least one through hole;

coating a photoresist on the upper surface of said support plate and within said through hole and exposing and etching said coated photoresist using a mask having a predetermined pattern so that edge portions of said support plate are removed, thereby to separate said support plate from adjacent support plates;

forming a post on one side of an inner surface of said through hole by a sputtering process;

forming a reflecting plate on an upper surface of said support plate; and removing said thick film.

2. The method of manufacturing a deformable mirror device as claimed in claim 1, wherein at least one of said support plate, said reflecting plate and said post is formed of aluminum.

3. The method of manufacturing a deformable mirror device as claimed in claim 1, wherein said through hole is formed in a shape of one of a rectangle, a triangle, a trapezoid, a letter T, and a combination of the rectangle with the trapezoid.

4. The method of manufacturing a deformable mirror device as claimed in claim 1, wherein said thick film is formed of at least one material selected from the group consisting of photoresist, polymethyl methacrylate (PMMA) and polyimide.

5. A method of manufacturing a deformable mirror device, comprising, as stated in the following order, the steps of:

forming an electrode layer on a substrate in a predetermined pattern;

forming a thick film on upper surfaces of said substrate and said electrode layer;

situating a mask having a predetermined pattern on an upper surface of said thick film and partially etching said thick film to form at least one through hole;

coating a photoresist within said through hole and exposing and etching said coated photoresist using a mask having a predetermined pattern so that edge portions of said support plate are removed, thereby to separate said support plate from adjacent support plates;

forming a post on one side of an inner surface of said through hole by a sputtering process;

forming a support plate on the upper surface of said thick film;

forming a photoresist layer within said through hole;

forming a reflecting plate on said support plate and said photoresist layer to fill up an upper part of said through hole; and removing said thick film and said photoresist layer.

6. The method of manufacturing a deformable mirror device as claimed in claim 5, wherein at least one of said support plate, said reflecting plate and said post is formed of aluminum.

7. The method of manufacturing a deformable mirror device as claimed in claim 5, wherein said through hole is formed in a shape of one of a rectangle, a triangle, a trapezoid, a letter T, and a combination of the rectangle with the trapezoid.

8. The method of manufacturing a deformable mirror device as claimed in claim 5, wherein said thick film is formed of at least one material selected from the group consisting of photoresist, polymethyl methacrylate (PMMA) and polyimide.

* * * * *